United States Patent [19]

Sakamoto

[11] Patent Number: 5,436,046
[45] Date of Patent: Jul. 25, 1995

[54] INTERIOR FINISHING WEB AND METHOD OF PRODUCING THE SAME

[75] Inventor: Manabu Sakamoto, Ayase, Japan

[73] Assignee: Ikeda Bussan Co., Ltd., Ayase, Japan

[21] Appl. No.: 250,574

[22] Filed: May 27, 1994

[30] Foreign Application Priority Data

Jun. 30, 1993 [JP] Japan .................. 5-183478

[51] Int. Cl.$^6$ .............. B29D 22/00; B32B 1/00;
B32B 5/06; B32B 5/26
[52] U.S. Cl. .................. 428/36.2; 156/221;
156/224; 156/148; 428/287; 428/288; 428/300
[58] Field of Search .......... 428/287, 300, 36.2;
156/221, 224, 148

[56] References Cited

U.S. PATENT DOCUMENTS

| | | | |
|---|---|---|---|
| 4,195,112 | 3/1980 | Sheard | 428/288 |
| 4,258,093 | 3/1981 | Benedyk | 428/85 |
| 4,342,813 | 8/1982 | Erickson | 428/288 |
| 4,418,031 | 11/1983 | Doerer | 428/288 |
| 4,568,581 | 2/1986 | Peoples et al. | 428/296 |
| 4,851,274 | 7/1989 | D'Elia | 428/296 |
| 4,873,133 | 10/1989 | Giles | 428/288 |
| 4,931,358 | 6/1990 | Wakl et al. | 428/286 |
| 5,217,799 | 6/1993 | Sumii et al. | 428/286 |
| 5,298,319 | 3/1994 | Donahue et al. | 428/300 |
| 5,374,458 | 12/1994 | Burgio | 428/298 |

*Primary Examiner*—James C. Cannon
*Attorney, Agent, or Firm*—Foley & Lardner

[57] ABSTRACT

An interior finishing web for a motor vehicle or the like comprises three fibrous layers which are put one another, needled together and subjected to a hot-molding to constitute a shaped structure of the web. The three fibrous layers are a first fibrous layer which includes approximately 30 to 90% by weight of polyester fibers and approximately 70 to 10% by weight of polypropylene fibers, a second fibrous layer which includes approximately 10 to 60% by weight of polyester fibers and approximately 90 to 40% by weight of polypropylene fibers and a third fibrous layer which includes approximately 40 to 90% by weight of polyester fibers and approximately 60 to 10% by weight of polypropylene fibers.

8 Claims, 1 Drawing Sheet

INTERIOR FINISHING WEB AND METHOD OF PRODUCING THE SAME

BACKGROUND OF THE INVENTION

1. Field of the Invention

The present invention relates in general to interior finishing materials for a motor vehicle and methods of producing the same, and more particularly, to vehicular interior finishing webs, such as passenger room rugs, trunk room rugs or the like and methods of producing the same.

2. Description of the Prior Art

Hitherto, various types of interior finishing webs have been proposed and put into practical use particularly in the field of passenger motor vehicles. As is known to those skilled in the art, as the interior finishing web for the motor vehicle, various properties are required by the web, which are for example toughness, lower cost, good formability, high shape keeping ability, light weight, and so on.

Some of the conventional interior finishing webs are of a type which comprises a base layer of felt and an outer layer of fibrous material. The base layer of felt comprises about 70% by weight of polyester fibers and about 30% by weight of polypropylene fibers which are mixed to constitute the felt structure, and the fibrous outer layer comprises as a major material polyester fibers which have a higher fusing point than the polypropylene fibers. In molding the interior finishing web with heat, the polypropylene fibers in the felt, which have thus lower fusing point, are fused and thus the same serve as a binder of the two layers, which are the base and outer layers.

However, due to its inherent construction, the interior finishing web having the above-mentioned structure has failed to exhibit a satisfied toughness and a satisfied shape keeping ability. Although increasing the mixing ratio of the polypropylene fibers may solve such drawbacks, it assuredly lowers the formability of the web. Furthermore, increasing the thickness of the felt layer or lining the felt layer with a polyethylene layer in an attempt to solve such drawbacks would increase the weight and production cost of the interior finishing web.

SUMMARY OF THE INVENTION

It is therefore an object of the present invention to provide an interior finishing web which is free of the above-mentioned drawbacks.

It is another object of the present invention to provide a method of producing the interior finishing web.

According to a first aspect of the present invention, there is provided an interior finishing web. The web comprises first fibrous layer which includes approximately 30 to 90% by weight of polyester fibers and approximately 70 to 10% by weight of polypropylene fibers; a second fibrous layer which includes approximately 10 to 60% by weight of polyester fibers and approximately 90 to 40% by weight of polypropylene fibers; and a third fibrous layer which includes approximately 40 to 90% by weight of polyester fibers and approximately 60 to 10% by weight of polypropylene fibers, wherein the first, second and third fibrous layers are put on one another to constitute a three-layered sheet, the three-layered sheet being needled together and subjected to a hot-molding to constitute a shaped structure.

According to a second aspect of the present invention, there is provided a method of producing an interior finishing web. The method comprises the steps of (a) putting first, second and third fibrous layers on one another in order to constitute a three-layered sheet, the first fibrous layer including approximately 30 to 90% by weight of polyester fibers and approximately 70 to 10% by weight of polypropylene fibers, the second fibrous layer including approximately 10 to 60% by weight of polyester fibers and approximately 90 to 40% by weight of polypropylene fibers and the third fibrous layer including approximately 40 to 90% by weight of polyester fibers and approximately 60 to 10% by weight of polypropylene fibers; (b) needling the three-layered sheet to constitute a combined needled sheet; and (c) molding the combined needled sheet at a given temperature to constitute a shaped structure.

BRIEF DESCRIPTION OF THE DRAWINGS

Other objects and advantages of the present invention will become apparent from the following description when taken in conjunction with the accompanying drawings, in which.

BRIEF DESCRIPTION OF THE INVENTION

Figure 1:
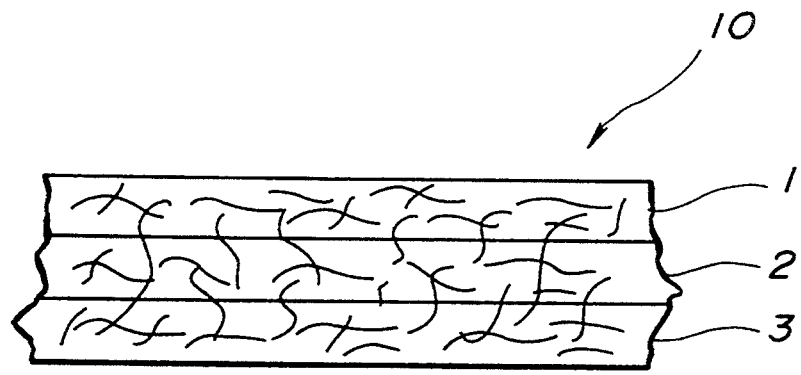
FIG. 1 is a schematically illustrated sectional view of an interior finishing web according to the present invention.

In order to provide a satisfied interior finishing web which is free of the above-mentioned drawbacks, the inventor has carried out various examinations and tests and finally found the following facts.

That is, when first, second and third fibrous layers, which will be each described hereinafter, are put on one another, needled together and molded with heat, an excellent interior finishing web is produced.

As the material of the first fibrous layer, a mixture comprising about 30 to 90% by weight of polyester fibers and about 70 to 10% by weight of polypropylene fibers can be used. Preferably, the mixture comprising about 50 to 70% by weight of polyester fibers and about 50 to 30% by weight of polypropylene fibers is used as the material for the first fibrous layer, and the basis weight of the first fibrous layer is about 150 g/m². As the material of the second fibrous layer, a mixture comprising about 10 to 60% by weight of polyester fibers and about 90 to 40% by weight of polypropylene fibers can be used. Preferably, the mixture comprising about 30 to 50% by weight of polyester fibers and about 70 to 50% by weight of polypropylene fibers is used as the material for the second fibrous layer and the basis weight of the second fibrous layer is about 300 g/m². As the material of the third fibrous layer, a mixture comprising about 40 to 90% by weight of polyester fibers and about 60 to 10% by weight of polypropylene fibers can be used. Preferably, the mixture comprising about 50 to 70% by weight of polyester fibers and about 50 to 30% by weight of propylene fibers is used as the material for the third fibrous layer and the basis weight of the third fibrous layer is about 300 g/m².

When the content of the polypropylene fibers of the first fibrous layer is greater than 70% by weight, the external appearance of the molded web is lowered because of appearance of unsightly melted polypropylene on the surface thereof. That is, when the web is subjected to the heat-molding (viz., thermoforming), excessive part of the melted polypropylene fibers oozes out of the first fibrous layer causing a poor-looking of the web. While, when the content of the polyester fibers of the first fibrous layer is smaller than 10% by weight, the shape keeping ability of the produced web is deteriorated. This shape keeping ability is sharply lowered when the content of polyester fibers is smaller than 10% by weight.

When the content of the polypropylene fibers of the second fibrous layer is greater than 90% by weight, the external appearance and cushioning ability of the molded web are lowered. That is, when the web is subjected to the heat molding, excessive amount of the melted polypropylene fibers weakens the mechanical strength of the same. While, when the content of the polyester fibers of the second fibrous layer is smaller than 50% by weight, the shape keeping ability of the produced web is deteriorated, and when the content of the same become smaller than 40% by weight, the shape keeping ability is sharply lowered.

When the content of the polypropylene fibers of the third fibrous layer is greater than 60% by weight, the cushioning ability of the produced web is lowered. While, when the content of the polyester is smaller than 30% by weight, the shape keeping ability of the produced web is lowered, and when the content of the same becomes smaller than 10% by weight, the shape keeping ability is shapely lowered.

DETAILED DESCRIPTION OF THE INVENTION

In the following, the present invention will be described in detail with reference to the accompanying drawings.

Referring to FIG. 1, there is schematically shown an interior finishing web 10 according to the present invention.

The web 10 comprises first, second and third fibrous layers 1, 2 and 3 which are needled together and heat-molded to constitute a shaped structure. The first fibrous layer 1 constitutes an outer layer of the web 10, the second fibrous layer 2 constitutes an intermediate layer of the web 10 and the third fibrous layer 3 constitutes a back layer of the web 10.

In order to find out a desired or satisfied shaped web 10, the inventor carried out the following tests and examinations.

First, many test samples having different mixing ratio of contents were prepared for each of the three fibrous layers 1, 2 and 3. The mixing ratio of the contents of each fibrous layer 1, 2 or 3 is shown in Table 1. As shown in this table, each of the fibrous layers 1, 2 and 3 comprised polyester fibers and polypropylene fibers which were mixed. The basis weights of the first, second and third fibrous layers 1, 2 and 3 were about 150 g/m$^2$, 300 g/m$^2$ and 300 g/m$^2$ respectively. The three fibrous layers 1, 2 and 3 were then put on one another in such a fashion as shown in FIG. 1. Then needling was carried out. That is, barbed needles (not shown) were repeatedly stuck in and out the layers 1, 2 and 3 from the first fibrous layer 1 toward the third fibrous layer 3. With this, the fibers of the first, second and third fibrous layers 1, 2 and 3 were forced to penetrate through these three fibrous layers 1, 2 and 3 and mingle with the fibers of the same. The combined needled sheet was thus produced. Then, the needled sheet was subjected to a heat-molding (viz., thermoforming) at a temperature of about 140° C. to produce a shaped web 10.

TABLE 1

| FIBROUS LAYER | CONTENTS (% by weight) | | BASIS WEIGHT (g/m$^2$) |
|---|---|---|---|
| | Polyester Fibers | Polypropylene Fibers | |
| First layer | 30–90 | 70–10 | about 150 |
| Second layer | 10–60 | 90–40 | about 300 |
| Third layer | 40–90 | 60–10 | about 300 |

In order to evaluate the mechanical strength of the shaped webs thus produced, the webs were subjected to a flexural rigidity test.

Figure 2:
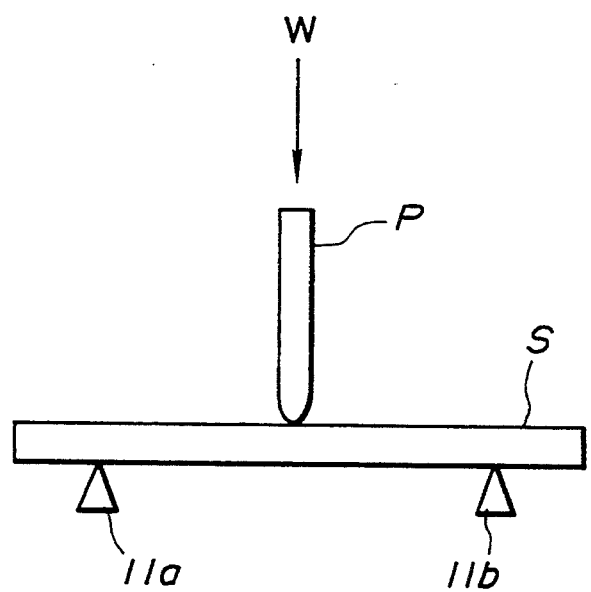
FIG. 2 is a drawing which schematically shows the method of testing the flexural rigidity of a test piece of the interior finishing web of the present invention.

For this test, test pieces "S" were taken from the webs, each test piece having a size of 150 mm in length and 50 mm in width, and a testing machine schematically shown in FIG. 2 was prepared. In this testing, two supporting members 11a and 11b spaced by 100 mm were used for equally supporting the test piece "S", and the middle portion of the test piece "S" was pressed by a press plate "P". The load "W" to the press plate "P" was gradually increased until the test piece "S" was bent by the press plate "P". The maximum load "W" measured when the test piece "S" was completely bent by the press plate "P" was used as an index for the flexural rigidity of the test piece "S", that is, as an index for the mechanical strength of the shaped web. About 0.26 Kgf to about 0.43 Kgf were measured for such testing. In fact, the results of such tests were averaged for impartially evaluating the mechanical strength of the webs. The averaged value was about 0.39 Kgf. The afore-mentioned conventional interior fishing web (viz., the web comprising a base layer of felt and an outer layer of fibrous material) showed only 0.24 Kgf.

In order to obtain much ideal products, the inventor has carried out additional examinations and finally found that the contents of the layers 1, 2 and 3 as shown in Table 2 could provide the products with much assured mechanical strength.

TABLE 2

| FIBROUS LAYER | CONTENTS (% by weight) | | BASIS WEIGHT (g/m$^2$) |
|---|---|---|---|
| | Polyester Fibers | Polypropylene Fibers | |
| First layer | 50–70 | 50–30 | about 150 |
| Second layer | 30–50 | 70–50 | about 300 |
| Third layer | 50–70 | 50–30 | about 300 |

In the following, advantages of the present invention will be described.

First, in order to provide the shaped web with both a satisfied mechanical strength and a satisfied shape keeping ability, the second fibrous layer 2 contains a larger amount of polypropylene fibers than the first and third fibrous layers 1 and 3. Because the second fibrous layer 2 is sandwiched by the first and third fibrous layers 1 and 3, the unsightly melted polypropylene which would appear on the surfaces of the second fibrous layer 2 is fully concealed by the first and third fibrous layers 1 and 3. That is, in accordance with the present invention, the satisfied mechanical strength and shape keeping ability are both obtained by the web without lowering the external appearance of the same.

Second, because of usage of the low-priced polypropylene fibers as the major material, the web of the present invention can be produced at a low cost.

Third, because the third fibrous layer 3 contains a larger amount of polyester fibers, it can offer a good or soft external view.

What is claimed is:

1. An interior finishing web comprising:
    a first fibrous layer including approximately 30 to 90% by weight of polyester fibers and approximately 70 to 10% by weight of polypropylene fibers;
    a second fibrous layer including approximately 10 to 60% by weight of polyester fibers and approximately 90 to 40% by weight of polypropylene fibers;
    a third fibrous layer including approximately 40 to 90% by weight of polyester fibers and approximately 60 and 10% by weight of polypropylene fibers,
    wherein said first, second and third fibrous layers are put on one another to constitute a three-layered sheet, said three-layered sheet being needled together and subjected to a hot-molding to constitute a shaped structure.

2. An interior finishing web as claimed in claim 1, in which said first fibrous layer includes approximately 50 to 70% by weight of polyester fibers and approximately 50 to 30% by weight of polypropylene fibers, in which said second fibrous layer includes approximately 30 to 50% by weight of polyester fibers and approximately 70 to 50% by weight of polypropylene fibers, and in which said third fibrous layer includes approximately 50 to 70% by weight of polyester fibers and approximately 50 to 30% by weight of polypropylene fibers.

3. An interior finishing web as claimed in claim 2 in which said first fibrous layer has a basis weight of approximately 150 g/m², in which said second fibrous layer has a basis weight of approximately 300 g/m², and in which said third fibrous layer has a basis of weight of approximately 300 g/m².

4. An interior finishing web as claimed in claim 3, in which said hot-molding is carried out at a temperature of approximately 140 ° C.

5. A method of producing an interior finishing web, comprising the steps of:
    (a) putting first, second and third fibrous layers on one another in order to constitute a three-layered sheet, said first fibrous layer including approximately 30 to 90% by weight of polyester fibers and approximately 70 to 10% by weight of polypropylene fibers, said second fibrous layer including approximately 10 to 60% by weight of polyester fibers and approximately 90 to 40% by weight of polypropylene fibers and said third fibrous layer including approximately 40 to 90% by weight of polyester fibers and approximately 60 to 10% by weight of polypropylene fibers;
    (b) needling said three-layered sheet to constitute a combined needled sheet; and
    (c) molding said combined needled sheet at a given temperature to constitute a shaped structure.

6. A method as claimed in claim 5, in which said given temperature is approximately 140 ° C.

7. A method as claimed in claim 5, in which said first fibrous layer includes approximately 50 to 70% by weight of polyester fibers and approximately 50 to 30% by weight of polypropylene fibers, in which said second fibrous layer includes approximately 30 to 50% by weight of polyester fibers and approximately 70 to 50% by weight of polypropylene fibers, and in which said third fibrous layer includes approximately 50 to 70% by weight of polyester fibers and approximately 50 to 30% by weight of polypropylene fibers.

8. A method as claimed in claim 7, in which said first fibrous layer has a basis weight of approximately 150 g/m², in which said second fibrous layer has a basis weight of approximately 300 g/m², and in which said third fibrous layer has a basis of weight of approximately 300 g/m².

* * * * *